United States Patent
Nakayama

(10) Patent No.: US 7,117,714 B2
(45) Date of Patent: Oct. 10, 2006

(54) OUTPUT AMPLIFIER CIRCUIT AND SENSOR DEVICE USING THE SAME

(75) Inventor: Akira Nakayama, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/237,977

(22) Filed: Sep. 29, 2005

(65) Prior Publication Data

US 2006/0130583 A1   Jun. 22, 2006

(30) Foreign Application Priority Data

Dec. 16, 2004   (JP)   ............... 2004-364310

(51) Int. Cl.
   *G01P 21/00*   (2006.01)
   *G01P 15/12*   (2006.01)
   *G01L 9/06*    (2006.01)

(52) U.S. Cl. ............. 73/1.38; 73/514.33; 73/1.88

(58) Field of Classification Search ......... 73/514.33, 73/514.36, 1.37, 1.38, 1.77, 1.78, 1.88
   See application file for complete search history.

(56) References Cited

U.S. PATENT DOCUMENTS 5,343,731 A * 9/1994  Miyano ............... 73/514.36
5,612,488 A * 3/1997  Yamamoto et al. ......... 73/1.38
5,854,421 A * 12/1998 Yamamoto ............... 73/1.88

FOREIGN PATENT DOCUMENTS

| JP | 07-244071   |   | 9/1995 |
| JP | 9-61189     | * | 3/1997 |
| JP | 2003-215172 |   | 7/2003 |

* cited by examiner

*Primary Examiner*—Helen Kwok
(74) *Attorney, Agent, or Firm*—Nixon Peabody LLP; Donald R. Studebaker

(57) ABSTRACT

A device which includes an acceleration sensor for outputting small differential voltages VIP and VIN using resistance changes, and an output amplifier for amplifying the voltage difference. The output amplifier includes an offset-voltage adjustment circuit and an instrumentation amplifier. The instrumentation amplifier includes a first Op-amp having inputs connected to VIP and offset-voltage input terminals, a second Op-amp having inputs connected to VIN and VCOM input terminals, and a third Op-amp having inputs connected to outputs of the first and second Op-amps via resistors. The reference voltage VCOM of the instrumentation amplifier output is also applied to the second Op-amp.

4 Claims, 2 Drawing Sheets

OUTPUT AMPLIFIER CIRCUIT AND SENSOR DEVICE USING THE SAME

BACKGROUND OF THE INVENTION

1. Field of the Invention

The present invention relates to an output amplifier circuit, which includes an instrumentation amplifier for amplifying a small differential voltage output from a sensor such as an acceleration sensor and an offset voltage adjustment circuit, and a sensor device using the output amplifier circuit.

2. Description of the Related Art

An example of an output amplifier circuit including an instrumentation amplifier having an offset adjustment capability is illustrated in the description and FIGS. 1 and 6 of Japanese Unexamined Patent Publication Kokai No. 2003-215172 which is entitled "CHARGE/DISCHARGE CURRENT DETECTION CIRCUIT AND VARIABLE RESISTIVE DEVICE" and is hereinafter referred to as a "first patent publication". An example of a sensor device for amplifying small differential output voltages output from an acceleration sensor through an output amplifier circuit having an instrumentation amplifier is illustrated in the description and FIGS. 4 and 7 of Japanese Unexamined Patent Publication Kokai No. H7-244071, which is entitled "SENSITIVITY ADJUSTMENT DEVICE FOR ACCELERATION SENSOR" and is hereinafter referred to as a "second patent publication".

The output amplifier circuit described in the first patent publication is composed of an instrumentation amplifier and an off set voltage adjustment circuit. The instrumentation amplifier amplifies a small differential voltage output from a bridge circuit or the like, and requires a high gain of, for example, several tens to several thousand fold, a low drift, and a low offset. Accordingly, the instrumentation amplifier of the first patent publication amplifies small differential output voltages from detection resistors through first and second operational amplifiers (hereinafter, also referred to as an "Op-amp"), and switches between the output voltages of the first and second Op-amps using a switch, and further amplifies the switched output voltage through a third Op-amp to output an amplifier circuit output voltage. In addition, an offset voltage adjustment circuit is provided to adjust the offset error of the third Op-amp.

The sensor device described in the second patent publication is composed of an acceleration sensor including a Wheatstone circuit using piezoresistive elements and an output amplifier circuit for amplifying small differential output voltages from the acceleration sensor through an instrumentation amplifier. The instrumentation amplifier, which constitutes the output amplifier circuit, amplifies the differential output voltages through first and second amplifiers, and amplifies the difference between output voltages of the first and second Op-amps to output an amplifier circuit output voltage.

The output amplifier circuit described in the first patent publication uses the offset-voltage adjustment circuit to adjust the offset voltage of the third Op-amp provided at the output stage. However, the offset voltages of the first and second Op-amps are different from each other, so that the Op-amp adjustment value for the third Op-amp when the first Op-amp is connected to the third Op-amp via the switch must be different from that when the second Op-amp is connected to the third Op-amp via the switch. This makes it difficult for the offset adjustment circuit to set the Op-amp adjustment value. This problem occurs also in the output amplifier circuit described in the second patent publication.

To solve these problems, one might propose, for example, in the output amplifier circuit of the second patent publication, that the voltage adjustment circuit be connected to the input of either the first Op-amp or the second Op-amp (for example, the input of the first Op-amp) and that the offset voltage of the first Op-amp be adjusted so as to make the output voltages of the first and second Op-amps equal.

However, in this configuration, for example, if common mode noise is carried in the differential output voltages from the acceleration sensor described in the second patent publication, the output voltage of the amplifier circuit may vary from a specified value, thereby worsening a Common Mode Rejection Ratio (CMRR).

SUMMARY OF THE INVENTION

Therefore, it is an object of the present invention to provide an output amplifier circuit and a sensor device using the same to overcome the above problems.

In accordance with a first aspect of the present invention, the above and other objects can be accomplished by the provision of an output amplifier circuit comprising an offset voltage adjustment circuit for outputting a desired offset voltage adjusted according to an external instruction; a first input terminal for receiving a first electrode voltage of a differential output voltage; a second input terminal for receiving a second electrode voltage of the differential output voltage; a first voltage input terminal for receiving the offset voltage; a second voltage input terminal for receiving a reference voltage of an instrumentation amplifier output; and an instrumentation amplifier for amplifying the differential output voltage received through the first and second input terminals and outputting an amplifier circuit output voltage.

The instrumentation amplifier includes a first operational amplifier having a non-inverting input connected to the first input terminal and an inverting input connected to the first voltage input terminal via a resistor; a second operational amplifier having a non-inverting input connected to the second input terminal and an inverting input connected to the second voltage input terminal via a resistor; and a third operational amplifier having a non-inverting input, connected to an output of the first operational amplifier and the second voltage input terminal via resistors, and an inverting input connected to an output of the second operational amplifier via a resistor, the third operational amplifier outputting the amplifier circuit output voltage through an output of the third operational amplifier.

In accordance with a second aspect of the present invention, there is provided an output amplifier circuit comprising a reference voltage input terminal for receiving a reference voltage of an instrumentation amplifier output; an offset voltage adjustment circuit for outputting a desired offset voltage adjusted according to an external instruction, and an adjustment voltage obtained by inverting a level of the offset voltage with respect to the reference voltage received through the reference voltage input terminal; a first input terminal for receiving a first electrode voltage of a differential output voltage; a second input terminal for receiving a second electrode voltage of the differential output voltage; a first voltage input terminal for receiving the offset voltage; a second voltage input terminal for receiving the adjustment voltage; and an instrumentation amplifier for amplifying the difference between the first and second differential voltages received through the first and second input terminals and outputting an amplifier circuit output voltage.

The instrumentation amplifier includes a first operational amplifier having a non-inverting input connected to the first input terminal and an inverting input connected to the first voltage input terminal via a resistor; a second operational amplifier having a non-inverting input connected to the second input terminal and an inverting input connected to the second voltage input terminal via a resistor; and a third operational amplifier having a non-inverting input, connected to an output of the first operational amplifier and the reference voltage input terminal via resistors, and an inverting input connected to an output of the second operational amplifier via a resistor, the third operational amplifier outputting the amplifier circuit output voltage through an output of the third operational amplifier.

In accordance with a third aspect of the present invention, there is provided a sensor device comprising the output amplifier circuit according to the first or second aspect; and a sensor, connected to the first and second input terminals, for outputting differential output voltages based on resistance changes and inputting first and second electrode voltage of the differential output voltage to the first and second input terminals. The sensor is, for example, an acceleration sensor including a Wheatstone bridge circuit using a piezoresistive element.

In accordance with the first and third aspects of the present invention, the reference voltage of the instrumentation amplifier output is also applied to the second operational amplifier, and therefore the only factor of the received differential output voltages, which affects the amplifier circuit output voltage, is the difference between the differential output voltages to be amplified by the third operational amplifier, thereby improving the CMRR.

In accordance with the second and third aspects of the present invention, the adjustment voltage, which is obtained by inverting the level of the offset voltage with respect to the reference voltage of the instrumentation amplifier output, is also applied to the second operational amplifier. Accordingly, almost the same advantage as in the first and third aspects is achieved. In addition, even if the offset voltage is high, the voltage levels of the outputs of the first and second operational amplifiers are made equal to each other near the reference voltage of the instrumentation amplifier output, for example, before the sensor is accelerated. Thereafter, the sensor is accelerated and the voltage levels of the outputs of the first and second operational amplifiers are amplified, so that it is easy to set the input voltage range of the third operational amplifier.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A sensor device according to the present invention comprises a sensor such as an acceleration sensor for outputting small differential output voltages based on resistance changes and an output amplifier circuit for amplifying the differential output voltage output from the sensor and outputting an amplifier circuit output voltage.

The output amplifier circuit includes an offset voltage adjustment circuit for outputting a desired offset voltage adjusted according to an external instruction; a first input terminal for receiving a first electrode voltage of the differential output voltage; a second input terminal for receiving a second electrode voltage of the differential output voltage; a first voltage input terminal for receiving the offset voltage; a second voltage input terminal for receiving a reference voltage of an instrumentation amplifier output; and an instrumentation amplifier for amplifying the differential output voltage received through the first and second input terminals and outputting an amplifier circuit output voltage.

The instrumentation amplifier includes a first amplifier having a non-inverting input connected to the first input terminal and an inverting input connected to the first voltage input terminal via a resistor; a second amplifier having a non-inverting input connected to the second input terminal and an inverting input connected to the second voltage input terminal via a resistor; and a third amplifier having a non-inverting input, connected to an output of the first amplifier and the second voltage input terminal via resistors, and an inverting input connected to an output of the second amplifier via a resistor, the third amplifier outputting the amplifier circuit output voltage from an output of the third amplifier.

[First Embodiment]
(Configuration)

Figure 1:
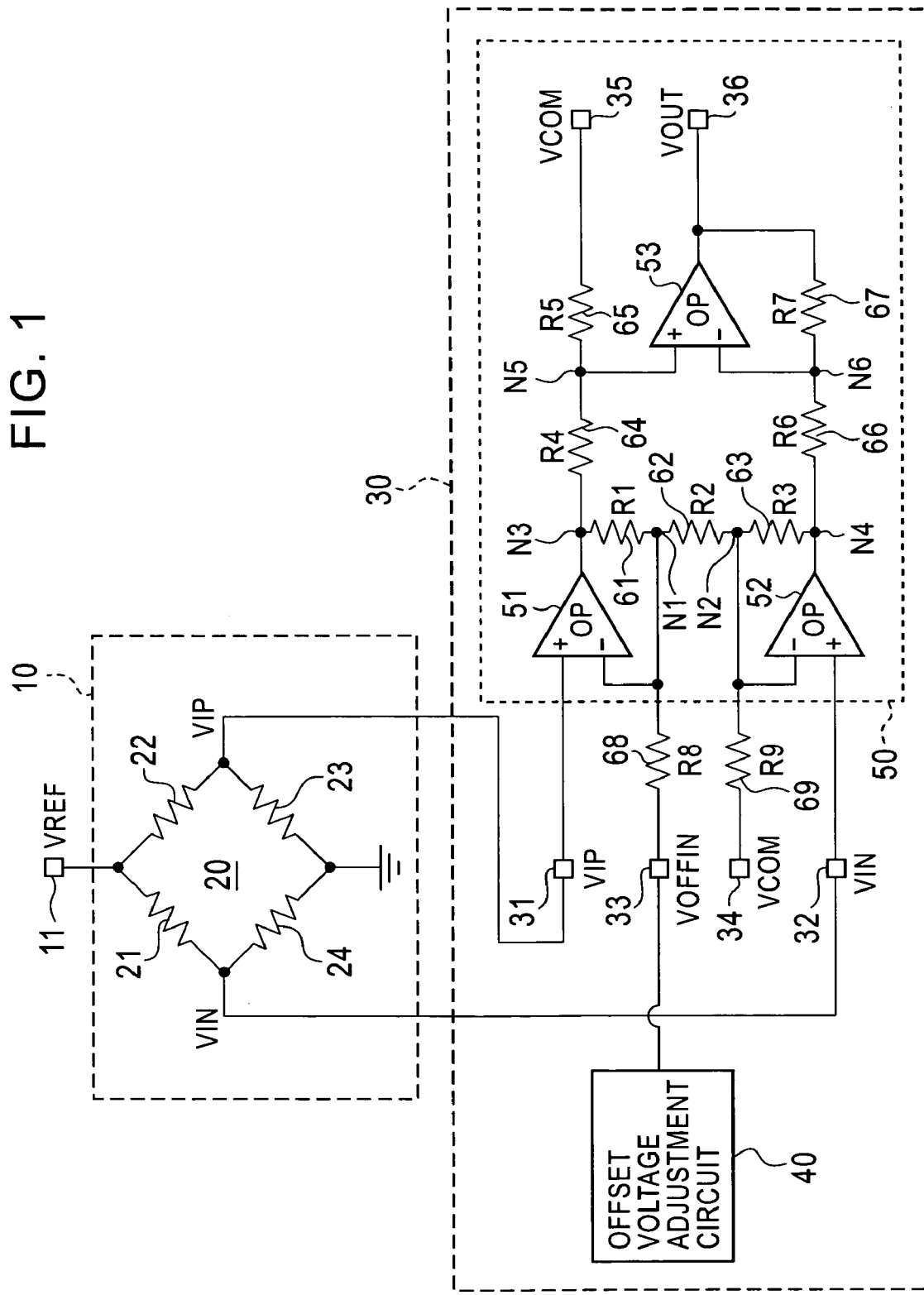
FIG. 1 is a circuit diagram of an acceleration sensor device according to a first embodiment of the present invention.

FIG. 1 is a circuit diagram of an acceleration sensor device which is a sensor device according to a first embodiment of the present invention.

The acceleration sensor device comprises a sensor (for example, an acceleration sensor) 10 for outputting a small differential output voltage (for example, a first electrode voltage VIP and a second electrode voltage VIN) based on resistance changes, and an output amplifier circuit 30 for amplifying the difference between the differential output voltages VIP and VIN, which is composed of, for example, a semiconductor integrated circuit.

The acceleration sensor 10 includes a Wheatstone bridge circuit 20 connected between ground and a reference voltage input terminal 11 through which a reference voltage VREF is input. The Wheatstone bridge circuit 20 includes 4 piezoresistive elements 21 to 24, and detects their resistance changes as changes of the bridge output voltages and then outputs differential output voltages VIP and VIN to the output amplifier circuit 30.

The output amplifier circuit 30 includes a first input terminal 31 for receiving the differential output voltage VIP, a second input terminal 32 for receiving the differential output voltage VIN, a first voltage input terminal 33 for receiving an offset voltage VOFFIN, a second voltage input terminal 34 for receiving a reference voltage VCOM of an instrumentation amplifier output, which is half of the reference voltage VREF, a reference voltage input terminal 35 for receiving the reference voltage VCOM, and an output terminal 36 for outputting an amplifier circuit output voltage VOUT. The output amplifier circuit 30 further includes an offset voltage adjustment circuit 40, whose output is connected to the input terminal 33, and an instrumentation amplifier 50 whose inputs are connected to the input terminals 31 to 34. The offset voltage adjustment circuit 40 adjusts a desired offset voltage VOFFIN according to an instruction from the outside and outputs the adjusted offset voltage VOFFIN to the input terminal 33.

The instrumentation amplifier 50 includes first and second operational amplifiers 51 and 52 for amplifying the differential output voltages VIP and VIN input through the input terminals 31 and 32, a third operational amplifier 53 for receiving, as differential inputs, the output voltages amplified by the operational amplifiers 51 and 52 and amplifying the difference between the received output voltages, and resistors 61 to 67 having resistances R1 to R7 for setting the amplification gain of the instrumentation amplifier 50. The instrumentation amplifier 50 amplifies the difference between the differential output voltages VIP and VIN with reference to the reference voltage VCOM and outputs an output voltage VOUT to the output terminal 36.

Specifically, a non-inverting input of the operational amplifier 51 is connected to the input terminal 31, and an inverting input thereof is connected to the input terminal 33 via a resistor 68 having a resistance R8. A non-inverting input of the operational amplifier 52 is connected to the input terminal 32, and an inverting input thereof is connected to the input terminal 34 via a resistor 69 having a resistance R9. The output of the operational amplifier 51 is feedback-connected to the inverting input of the operational amplifier 51 via a node N3, the resistor 61, and a node N1. The output of the operational amplifier 52 is feedback-connected to the inverting input of the operational amplifier 52 via a node N4, the resistor 63, and a node N2. The nodes N1 and N2 are connected to each other via the resistor 62. The node N3 is connected to the non-inverting input of the operational amplifier 53 via the resistor 64 and the node N5 and the node N4 is connected to the inverting input of the operational amplifier 53 via the resistor 66 and the node N6. The node N5 is connected to the input terminal 35 via the resistor 65, and the node N6 is connected to the output terminal 36 via the resistor 67.

Generally, the resistances R1 to R7 of the resistors 61 to 67 for setting the amplification gain of the instrumentation amplifier 50 are set such that R1=R3, R4=R6, and R5=R7. The output voltage VOUT is measured when the acceleration sensor 10 is not accelerated, and the offset voltage VOFFIN output from the offset voltage adjustment circuit 40 is adjusted so that the voltage of the node N3 is equal to the voltage of the node N4 based on the measured output voltage VOUT. Generally, the amplification gain of the output amplifier circuit 30 is set to several hundred fold since the differential output voltages VIP and VIN of the acceleration sensor 10 undergo a very small voltage change from when the acceleration sensor 10 is not accelerated to when the acceleration sensor 10 is accelerated. The amplification gain of each of the operational amplifiers 51, 52, and 53 is set to several tenfold and the amplification gains of the operational amplifiers 51 and 52 are set equal to each other.

The first embodiment is characterized in that the input terminal 34 for receiving the reference voltage VCOM is connected to the node N2 via the resistor 69. One of the two input terminals 34 and 35 can be omitted since both are terminals for receiving the same reference voltage VCOM.

(Operation)

First, the output voltage VOUT is measured when the acceleration sensor 10 is not accelerated, and the offset voltage VOFFIN of the offset voltage adjustment circuit 40 is determined. Then, the determined offset voltage VOFFIN is output from the offset voltage adjustment circuit 40 according to an instruction from the outside, so that the voltage of the node N3 becomes equal to the voltage of the node N4. Thereafter, when the acceleration sensor 10 is accelerated, the piezoresistive elements 21 to 24 are deformed, and the differential output voltages VIP and VIN are output form the Wheatstone bridge circuit 20. The differential output voltages VIP and VIN of the acceleration sensor 10 are amplified by the operational amplifiers 51 and 52, changing the voltages of the nodes N3 and N4. The operational amplifier 53 receives the amplified output voltages as differential input voltages, and amplifies the difference between the output voltages amplified by the operational amplifiers 51 and 52 and outputs an amplified output voltage VOUT through the output terminal 36.

The following equations express the relationship between an offset voltage VOFFIN and differential output voltages VIPa and VINa of the acceleration sensor 10 when the acceleration sensor 10 is not accelerated.

$$V3 = VIPa + R1 \times |(VIPa - VOFFIN)/R8 + (VIPa - VINa)/R2| \quad (1)$$

$$V4 = VINa + R3 \times (VINa - VIPa)/R2 \quad (2)$$

Since V3=V4, $$VOFFIN = R8 \times (1 + 2 \times R1/R2) \times (VIPa - VINa)/R1 + VIPa \quad (3)$$

Here, R1=R3.

This offset voltage VOFFIN allows the voltage level of the node N3 to be equal to the voltage level of the node N4. Although the differential output voltages VIP and VIN of the acceleration sensor 10 undergo a very small voltage change from when the acceleration sensor 10 is not accelerated to when the acceleration sensor 10 is accelerated as described above, the node N3 and the node N4 undergoes a large voltage change, which is several times larger than that of the differential output voltages VIP and VIN of the accelerator sensor 10, from the voltage levels of the node N3 and the node N4 which have been made equal to each other by the offset voltage VOFFIN. Therefore, the input voltage range of the operational amplifier 53 is set so as to satisfy such voltage changes.

A description will now be given of the relationship between an output voltage VOUT of the output amplifier circuit 30 and differential output voltages VIP and VIN of the acceleration sensor 10 when the acceleration sensor 10 is accelerated.

In the case of a circuit configuration in which the input terminal 34 and the resistor 69 in FIG. 1 are removed and the inverting input of the operational amplifier 52 is connected to the node N2, which is hereinafter referred to as an "unimproved circuit configuration", the relationship between the differential output voltages VIP and VIN and the output voltage VOUT is expressed by the following equation.

$$VOUT = (R5/R4) \times |(1 + 2 \times R1/R2) \times (VIP - VIN) + (R1/R8) \times (VIP \times VOFFIN)| + VCOM \quad (4)$$

Here, R1=R3, R4=R6, and R5=R7.

However, for example, if common mode noise ΔV is carried in the differential output voltages VIP and VIN of the acceleration sensor 10 (i.e., VIP→VIP+ΔV and VIN→VIN+ΔV), the output voltage VOUT of the unimproved circuit configuration varies from the value of Equation (4) as expressed in Equation (5) because the offset voltage VOFFIN is applied only to the operational amplifier 51, thereby worsening the CMRR as explained above in the Description of the Related Art.

$$VOUT = \qquad (5)$$
$$(R5/R4) \times |(1 + 2 \times R1/R2) \times (VIP + \Delta V - VIN - \Delta V) + (R1/R8) \times$$
$$(VIP + \Delta V - VOFFIN)| + VCOM =$$
$$(R5/R4) \times |(1 + 2 \times R1/R2) \times (VIP - VIN) +$$
$$(R1/R8) \times (VIP + \Delta V - VOFFIN)| + VCOM$$

Here, R1=R3, R4=R6, and R5=R7.

To solve this problem, the first embodiment applies the reference voltage VCOM to the node N2 via the resistor 69, so that the relationship between the output voltage VOUT and the differential output voltages VIP and VIN when the acceleration sensor 10 is accelerated is expressed by the following Equation (6).

$$VOUT=(R5/R4)\times|(1+2\times R1/R2+R1/R8)\times(VIP-VIN)+ \\ (R1/R8)\times(VCOM-VOFFIN)|+VCOM \qquad (6)$$

Here, R1=R3, R4=R6, R5=R7, and R8=R9.

Accordingly, even if common mode noise ΔV is carried in the differential output voltages VIP and VIN of the acceleration sensor 10 (i.e., VIP→VIP+ΔV and VIN→VIN+ΔV), the output voltage VOUT does not vary from the value of Equation (6) as expressed in Equation (7).

$$VOUT = \qquad (7)$$
$$(R5/R4) \times |(1 + 2 \times R1/R2 + R1/R8) \times (VIP + \Delta V - VIN - \Delta V) +$$
$$(R1/R8) \times (VCOM - VOFFIN)| + VCOM =$$
$$(R5/R4) \times |(1 + 2 \times R1/R2 + R1/R8) \times (VIP - VIN) +$$
$$(R1/R8) \times (VCOM - VOFFIN)| + VCOM$$

Here, R1=R3, R4=R6, R5=R7, and R8=R9.

(Advantage)

In the first embodiment, the reference voltage VCOM of the instrumentation amplifier output is also applied to the operational amplifier 52, contrary to the undeveloped circuit configuration, and therefore the only factor of the differential output voltages VIP and VIN of the acceleration sensor 10, which affects the output voltage VOUT of the output amplifier circuit 30, is the difference (VIP-VIN) between the differential output voltages VIP and VIN, thereby improving the CMRR.

[Second Embodiment]

(Configuration)

Figure 2:
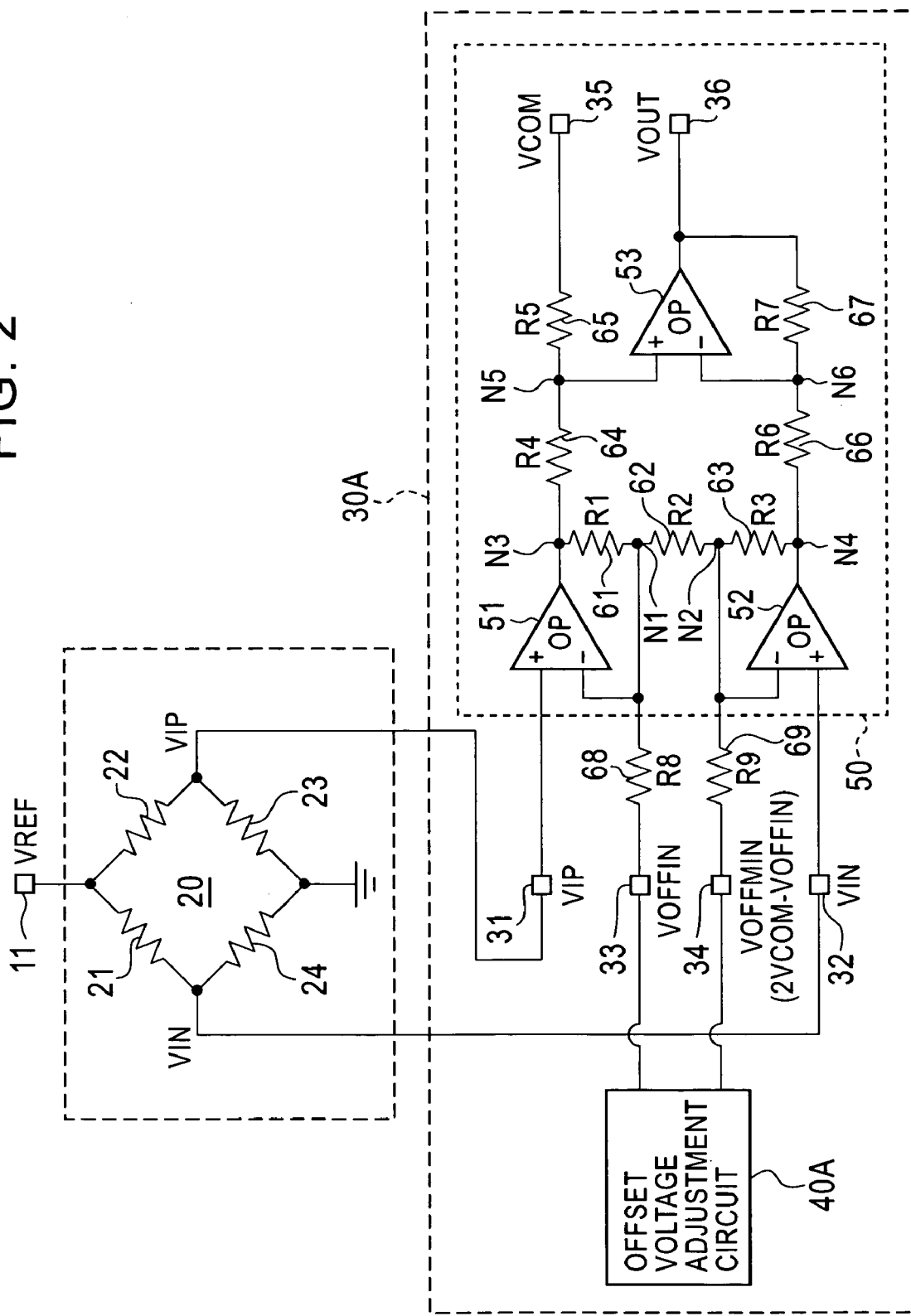
FIG. 2 is a circuit diagram of an acceleration sensor device according to a second embodiment of the present invention.

FIG. 2 is a circuit diagram of an acceleration sensor device which is a sensor device according to a second embodiment of the present invention, wherein elements identical to those of the first embodiment shown in FIG. 1 are denoted by the same reference numerals.

The second embodiment is different from the first embodiment in that an offset voltage adjustment circuit 40A, which has a different configuration from the offset voltage adjustment circuit 40 provided in the output amplification circuit 30 in the first embodiment, is provided in an output amplification circuit 30A and that an offset voltage VOFFIN output from the offset voltage adjustment circuit 40A is input to the first voltage input terminal 33 and an adjustment voltage VOFFMIN output therefrom is input to the second voltage input terminal 34. Other features of the second embodiment are similar to those of the first embodiment.

The offset voltage adjustment circuit 40A is configured so as to set not only the offset voltage VOFFIN but also the adjustment voltage VOFFMIN, which is obtained by inverting the offset voltage VOFFIN with respect to the reference voltage VCOM of the instrumentation amplifier output.

(Operation)

Basic operation of the second embodiment will not be described here since it is similar to that of the first embodiment. The following equations express the relationship between an output voltage VOUT of the output amplifier circuit 30A and differential output voltages VIP and VIN of the acceleration sensor 10 in the second embodiment when the acceleration sensor 10 is accelerated.

$$VOUT=(R5/R4)\times|(1+2\times R1/R2+R1/R8)\times(VIP-VIN)+ \\ (R1/R8)\times(VOFFMIN-VOFFIN)|+VCOM \qquad (8)$$

Here, R1=R3, R4=R6, R5=R7, and R8=R9.

Accordingly, even if common mode noise ΔV is carried in the differential output voltages VIP and VIN of the acceleration sensor 10 (i.e., VIP→VIP+ΔV and VIN→VIN+ΔV), the output voltage VOUT does not vary from the value of Equation (8) as expressed in Equation (9).

$$VOUT = \qquad (9)$$
$$(R5/R4) \times |(1 + 2 \times R1/R2 + R1/R8) \times (VIP + \Delta V - VIN - \Delta V) +$$
$$(R1/R8) \times (VOFFMIN - VOFFIN)| + VCOM =$$
$$(R5/R4) \times |(1 + 2 \times R1/R2 + R1/R8) \times (VIP - VIN) +$$
$$(R1/R8) \times (VOFFMIN - VOFFIN)| + VCOM$$

Here, R1=R3, R4=R6, R5=R7, and R8=R9.

The following equations express the relationship between differential output voltages VIPa and VINa of the acceleration sensor 10 and the offset voltage VOFFIN when the acceleration sensor 10 is not accelerated.

$$V3=VIPa+R1\times|(VIPa-VINa)/R2+(VIPa-VOFFIN)/R8| \qquad (10)$$

$$V4=VINa+R3\times|(VINa-VIPa)/R2+(VINa-VOFFMIN)/ \\ R9| \qquad (11)$$

Since V3=V4 and VOFFMIN=2VCOM−VOFFIN, $$VOFFIN=(R8/2)\times(1+2\times R1/R2+R1/R8)\times(VIPa-VINa)/ \\ R1+VCOM \qquad (12)$$

$$VOFFIN=(-R9/2)\times(1+2\times R3/R2+R3/R9)\times(VIPa- \\ VINa)/R3+VCOM \qquad (13)$$

Here, R1=R3 and R8=R9.

Accordingly, the offset voltage VOFFIN adjusts the voltage level of the node N3, and the adjustment voltage VOFFMIN, which is obtained by inverting the offset voltage VOFFIN with respect to the reference voltage VCOM of the instrumentation amplifier output, adjusts the voltage level of the node N4 so that the voltage levels of the nodes N3 and N4 are equal to each other near the reference voltage VCOM of the instrumentation amplifier output. The following is an example of Equations (10) to (13).

When the differential output voltages VIPa and VINa when the acceleration sensor 10 is not accelerated are 1.020V and 1.040V, the reference voltage VCOM of the instrumentation amplifier output is 1.000V, and the amplification gain of the output amplifier circuit 30A is 503 (R1=R3=115Ω, R2=10 Ω, R4=R6=10Ω, R5=R7=200 Ω, and R8=R9=100 Ω), calculation of Equation (12) and (13) yields VOFFIN=0.781V and VOFFMIN=1.219V and calculation of Equation (10) and (11) yields V3=V4=1.065V, which are equal to each other near the reference voltage VCOM (=1.000V) of the instrumentation amplifier output.

(Advantage)

In the second embodiment, the adjustment voltage VOFFMIN, which is obtained by inverting the offset voltage VOFFIN with respect to the reference voltage VCOM of the instrumentation amplifier output, is also applied to the operational amplifier 52, contrary to the undeveloped circuit configuration. Accordingly, the second embodiment achieves almost the same advantage as in the first embodiment. In addition, even if the offset voltage VOFFIN is high, the voltage levels of the nodes N3 and N3 are made equal to each other near the reference voltage VCOM of the instrumentation amplifier output before the acceleration sensor 10 is accelerated. Thereafter, the acceleration sensor 10 is accelerated and the voltage levels of the nodes N3 and N3 are amplified, so that it is easy to set the input voltage range of the operational amplifier 53.

The present invention is not limited to the first and second embodiments and various modifications or various applications are possible. For example, the following modification or application can be made as a third embodiment of the present invention.

Although the first and second embodiments have been described with reference to the instrumentation amplifier 50 which amplifies the output voltage of the acceleration sensor 10 which employs the piezoresistive elements 21 to 24 to constitute the Wheatstone bridge circuit 20, the present invention may be applied to an output amplifier circuit 30 or 30A using an instrumentation amplifier 50 which amplifies various other differential voltages, no matter which type of resistive elements and which type of sensor are employed.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2004-364310 which is hereby incorporated by reference.

What is claimed is:

1. An output amplifier circuit comprising:
an offset voltage adjustment circuit for outputting a desired offset voltage adjusted according to an external instruction;
a first input terminal for receiving a first electrode voltage of a differential output voltage;
a second input terminal for receiving a second electrode voltage of the differential output voltage;
a first voltage input terminal for receiving the offset voltage;
a second voltage input terminal for receiving a reference voltage of an instrumentation amplifier output; and
an instrumentation amplifier for amplifying the differential output voltage received through the first and second input terminals to output an amplifier circuit output voltage,
wherein the instrumentation amplifier includes:
a first operational amplifier having a non-inverting input connected to the first input terminal and an inverting input connected to the first voltage input terminal via a resistor;
a second operational amplifier having a non-inverting input connected to the second input terminal and an inverting input connected to the second voltage input terminal via a resistor; and
a third operational amplifier having a non-inverting input, connected to an output of the first operational amplifier and the second voltage input terminal via resistors, and an inverting input connected to an output of the second operational amplifier via a resistor, the third operational amplifier outputting the amplifier circuit output voltage through an output of the third operational amplifier.

2. An output amplifier circuit comprising:
a reference voltage input terminal for receiving a reference voltage of an instrumentation amplifier output;
an offset voltage adjustment circuit for outputting a desired offset voltage adjusted according to an external instruction, and an adjustment voltage obtained by inverting a level of the offset voltage with respect to the reference voltage received through the reference voltage input terminal;
a first input terminal for receiving a first electrode voltage of a differential output voltage;
a second input terminal for receiving a second electrode voltage of the differential output voltage;
a first voltage input terminal for receiving the offset voltage;
a second voltage input terminal for receiving the adjustment voltage; and
an instrumentation amplifier for amplifying the differential output voltage received through the first and second input terminals and outputting an amplifier circuit output voltage,
wherein the instrumentation amplifier includes:
a first operational amplifier having a non-inverting input connected to the first input terminal and an inverting input connected to the first voltage input terminal via a resistor;
a second operational amplifier having a non-inverting input connected to the second input terminal and an inverting input connected to the second voltage input terminal via a resistor; and
a third operational amplifier having a non-inverting input, connected to an output of the first operational amplifier and the reference voltage input terminal via resistors, and an inverting input connected to an output of the second operational amplifier via a resistor, the third operational amplifier outputting the amplifier circuit output voltage through an output of the third operational amplifier.

3. A sensor device comprising:
the output amplifier circuit according to claim 1, and
a sensor, connected to the first and second input terminals, for outputting a differential output voltage based on resistance changes and inputting first and second electrode voltage of the differential output voltage to the first and second input terminals.

4. The sensor device according to claim 3, wherein the sensor is an acceleration sensor including a Wheatstone bridge circuit using a piezoresistive element.

* * * * *